United States Patent
Watson et al.

(10) Patent No.: US 9,301,120 B2
(45) Date of Patent: *Mar. 29, 2016

(54) WIRELESS EMERGENCY CALL (ECALL) DEVICES AND ECALL SERVICE SUBSCRIPTION MANAGEMENT

(71) Applicant: AIRBIQUITY INC., Seattle, WA (US)

(72) Inventors: John Mahony Watson, Newberry (GB); Leon Hong, Sammamish, WA (US)

(73) Assignee: Airbiquity Inc., Seattle, WA (US)

(*) Notice: Subject to any disclaimer, the term of this patent is extended or adjusted under 35 U.S.C. 154(b) by 35 days.

This patent is subject to a terminal disclaimer.

(21) Appl. No.: 14/302,620

(22) Filed: Jun. 12, 2014

(65) Prior Publication Data
US 2014/0295785 A1    Oct. 2, 2014

Related U.S. Application Data

(63) Continuation of application No. 13/554,738, filed on Jul. 20, 2012, now Pat. No. 8,787,869.

(60) Provisional application No. 61/509,834, filed on Jul. 20, 2011.

(51) Int. Cl.
*H04W 4/22* (2009.01)
*H04W 4/00* (2009.01)
*H04W 4/04* (2009.01)

(52) U.S. Cl.
CPC ............... *H04W 4/22* (2013.01); *H04W 4/001* (2013.01); *H04W 4/046* (2013.01)

(58) Field of Classification Search
CPC ........ H04W 4/001; H04W 4/046; H04W 4/22
See application file for complete search history.

(56) References Cited

U.S. PATENT DOCUMENTS

| 6,040,800 A | 3/2000 | Raith |
| 6,073,005 A | 6/2000 | Raith |

(Continued)

FOREIGN PATENT DOCUMENTS

WO    2013/013140 A1    1/2013

OTHER PUBLICATIONS

Intelligent transport systems—ESafety-Ecall High level application protocols 3GPP Draft; W15-0180 HLAP PT Final 090710, 3rd Generation Partnership Project (3GPP), Mobile Competence Centre; 650, Route Des Lucioles; F-06921 Sophia-Antipolis Cedex; France, No. Kista; Aug. 14, 2009; XP050356954; pp. 1-65.

(Continued)

*Primary Examiner* — Kashif Siddiqui
(74) *Attorney, Agent, or Firm* — Schwabe, Williamson & Wyatt

(57) ABSTRACT

We disclose a new type of wireless telecommunications subscription service and related methods. In some embodiments, the new subscription service may be used by an eCall only MS, or by any other suitable wireless access device (NAD), in order to operate in a restricted access and mobility management (RAMM) mode (304). The RAMM service limits usage of network resources, while enabling utilization for certain limited kinds of calls. The service may be used for eCall, in the case of motor vehicles (FIG. 1), for example, or for machine to machine communications and remote alarms (FIG. 6). The new subscription service may be used to avoid an eCall only MS being denied access to a network due to non-use of a prepaid (USIM) subscription (314).

15 Claims, 5 Drawing Sheets

(56) References Cited

U.S. PATENT DOCUMENTS

| | | | |
|---|---|---|---|
| 6,115,596 A | 9/2000 | Raith | |
| 6,374,098 B1 | 4/2002 | Raith | |
| 7,873,345 B1* | 1/2011 | Dunne | H04W 76/007 455/404.1 |
| 2009/0253403 A1* | 10/2009 | Edge | H04W 76/007 455/404.2 |
| 2011/0159839 A1* | 6/2011 | Mcewen | H04W 4/22 455/404.1 |
| 2013/0023228 A1 | 1/2013 | Watson | |

OTHER PUBLICATIONS

Qualcomm Incorporated et al: Removal of EFECC usage from eCall test cases,: 3GPP Draft; 34123-1_CR2874_(Rel-9)_R5-106872, 3rd Generation Partnership Project (3GPP), Mobile Competence Centre; 650, Route Des Lucioles; F-06921 Sophia-Antopolis Cedex; France, vol. RAN WG5, No. Shanghai, China; Nov. 15, 2010, Dec. 1, 2010; XP050510925; pp. 1-17.

Nokia Siemens Networks et al: "Handling of RTR for Emergency Registration" 3GPP Draft; C4-111055 CR 29228 RTR Emergency Rel7, 3rd Generation Partnership Project (3GPP), Mobile Competence Centre; 650, Route Des Lucioles; F-06921 Sophia-Antopolis Cedex; France, vol. CT WG4, No. Tallinn; May 9, 2011, Apr. 29, 2011; XP050484857; pp. 1-5.

Airbiquity Inc.: "eCall Only Service Provisioning—for discussion and agreement", 3GPP Draft; S1-113106, 3rd Generation Partnership Project (3GPP), Mobile Competence Centre; 650, Route Des Lucioles; F-06921 Sophia-Antipolis Cedex; France, vol. DAWG1, No. San Francisco, CA, USA; Nov. 14, 2011-Nov. 18, 2011; Nov. 7, 2011; XP050574346; pp. 1-2.

International Search Report dated Oct. 26, 2012 in International Application No. PCT/US2012/047579; 14 pages.

\* cited by examiner

WIRELESS EMERGENCY CALL (ECALL) DEVICES AND ECALL SERVICE SUBSCRIPTION MANAGEMENT

RELATED APPLICATIONS

This application is a continuation of U.S. Ser. No. 13/554,738 filed Jul. 20, 2012 which claims the benefit of U.S. provisional application No. 61/509,834 filed Jul. 20, 2011 and each of which is herein incorporated by reference in its entirety.

TECHNICAL FIELD

This invention pertains to digital wireless telecommunications and, more specifically, to systems, networks, equipment and methods that may be used in various combinations to controllably limit mobile equipment access to and utilization of network resources, while still providing appropriate emergency services.

BACKGROUND OF THE INVENTION

An "eCall" is an emergency voice call, to a Public Safety Answering Point (PSAP) or other authorized emergency call center, sometimes supplemented with accident or incident related data. One set of eCall data may include a vehicle's identity, geographic location, direction of travel, and other information that can be used by the emergency services to locate the victim of an accident or crash, and thus save more lives and minimize the severity of injuries through early medical intervention or other assistance.

An eCall wireless network access device, referred to in the ETSI and 3GPP specifications as an eCall capable MS (mobile station) or UE (user equipment), may be designed and configured to access both eCall and non-emergency voice and data services. Alternatively, an MS may be configured for "eCall only" emergency calls. "eCall only" in this context also permits certain test calls and reconfiguration call access, as further explained below.

In this document, the term "vehicle" will be used to include, but is not limited to, motor driven vehicles. For example, a vehicle may be a bicycle. Further, "motor driven" includes but is not limited to internal combustion engines, diesel engines, electric vehicles, hybrid electric, and any other source of locomotion existing or later invented. Some acronyms used herein are defined as follows:

IVS data modem—The eCall data modem located in the IVS used to transmit the MSD information to the PSAP and receive feedback from the PSAP.

PLMN—Public Land Mobile Network

HLR—Home Location Register

MM—Mobility Management

MSD—Minimum Set of Data to be sent from the IVS to the PSAP. This includes the location information of the vehicle, direction of travel, number of passengers with fastened seat belts, vehicle information, and other information deemed relevant for the emergency service agencies.

PSAP—Public-Safety Answering Point.

PSAP data modem—An eCall data modem located in the PSAP used to receive MSD information from the IVS data transmitter and transmit feedback to the IVS.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one aspect, the present disclosure provides a method for use in a digital wireless telecommunications network that includes, for a given subscriber, indicating in the corresponding HLR record a subscription to a novel restricted access and mobility management ("RAMM") subscription service. The RAMM subscription service may be associated with a network access device (NAD) or other mobile station (MS) of a motor vehicle.

In one design, for a subscriber having a current subscription to the RAMM subscription service, the method includes maintaining at least the corresponding subscriber profile information held in the home location register HLR until the occurrence of a predetermined trigger event. This avoids denial of service, for example, after a period of non-use of a prepaid subscription. Acceptable triggers to purge the record may include notification of end of life of the associated motor vehicle, or deregistration of the network access device (MS) of the motor vehicle.

In another aspect, the restricted access and mobility management ("RAMM") subscription service may be utilized for communications between machines, for example to implement remote management, alarm systems, etc.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
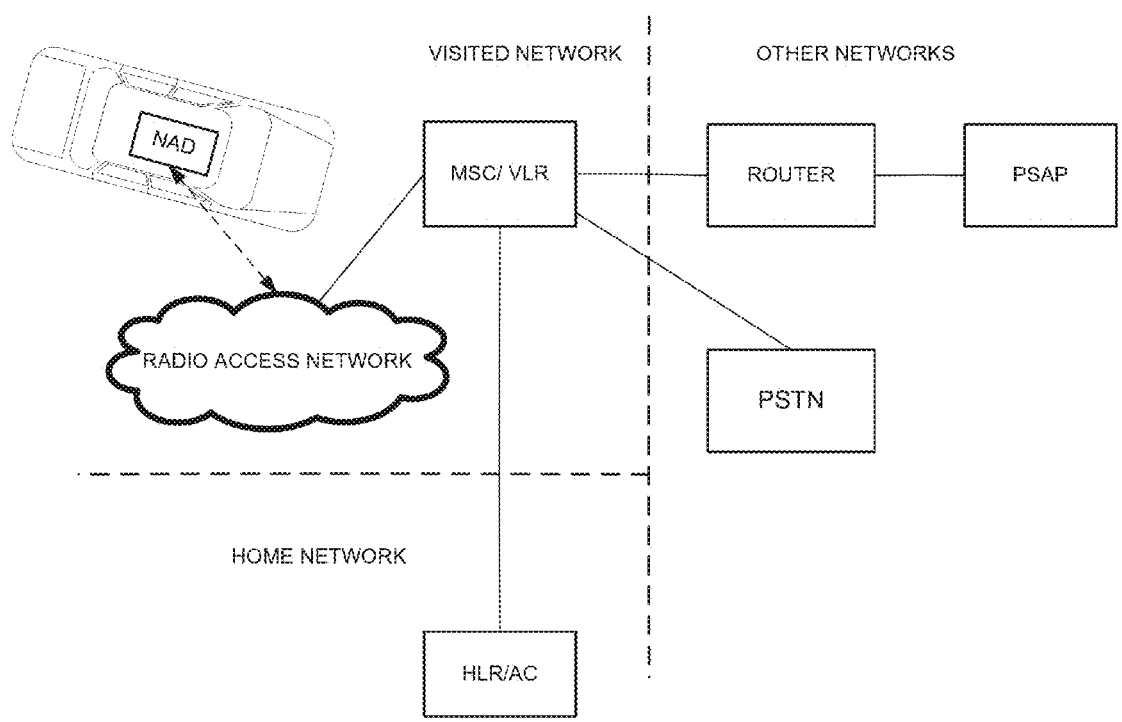
FIG. 1 is a simplified functional diagram illustrating a motor vehicle with wireless access to a wireless network implementation.

FIG. 1 is a simplified functional diagram illustrating a wireless network implementation 100. In the drawing, a motor vehicle 102 has an on-board network access device (NAD) to communicate via a radio access network 110. The vehicle may also include an in-vehicle system (IVS), not shown, to provide a variety of functionality including, for example, crash detection. Further, the IVS may communicate with a remote entity via the NAD. The network, for example comprising base stations (not shown) is coupled to a mobile switching center MSC. The MSC includes a visitor location register VLR, details of which are known. This MSC serves a "visited network" relative to the area labeled "home network" below. The home network includes a Home Location Register (HLR) 120.

The home location register (HLR) in general is a central database that contains details of each mobile phone subscriber that is authorized to use the core network. There can be several logical, and physical, HLRs per public land mobile network (PLMN), though one international mobile subscriber identity (IMSI)/MSISDN pair can be associated with only one logical HLR (which can span several physical nodes) at a time.

The HLRs store details of every SIM/USIM card issued by the mobile phone operator. Each SIM has a unique identifier called an IMSI (International Mobile Subscriber Identity) which is the primary key to each HLR record. Another important item of data associated with the SIM are the MSISDNs, which are the telephone numbers used by mobile phones to make and receive calls. The primary MSISDN is the number used for making and receiving voice calls and SMS, but it is possible for a SIM to have other secondary MSISDNs associated with it for fax and data calls. Each MSISDN is also a primary key to the HLR record. (Some of the terms and acronyms used herein may vary among different networks, technologies or technical specifications. The description is merely illustrative. A good resource for vocabulary used in wireless specifications is 3GPP TR 21.905.)

Referring again to FIG. 1, the MSC 112 may be coupled to a router 114 which in turn routes calls to a PSAP 116. The MSC may also route calls to the PSTN. Preferably the PSAP site includes a PSAP data modem (not shown). The modem may comprise an in-band signaling data modem used to receive MSD information from the IVS data transmitter and transmit feedback to the IVS.

Figure 2:
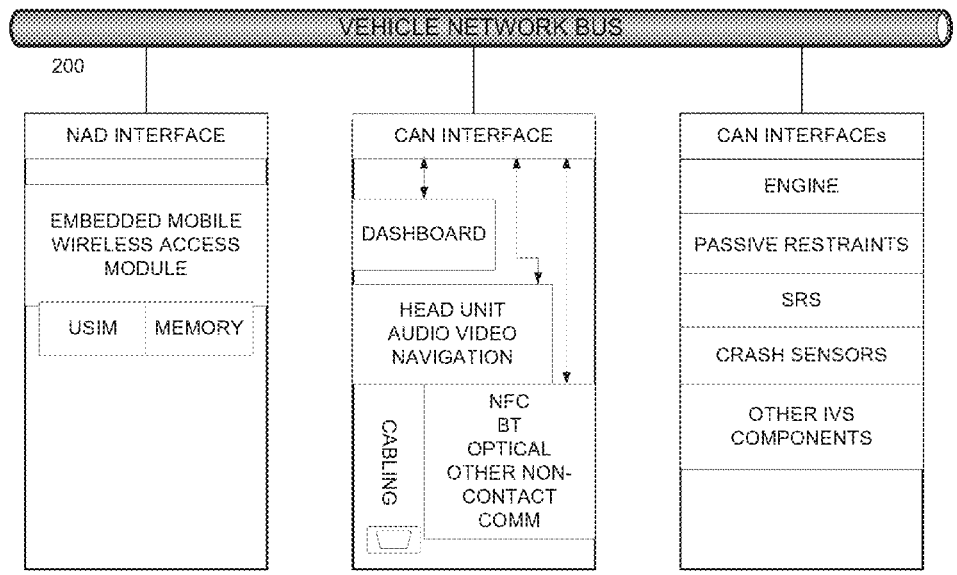
FIG. 2 illustrates an example of portions of a network on board a motor vehicle in which an embedded mobile wireless access device is coupled to the network.

Referring now to FIG. 2, it illustrates an example of portions of a network 200 implemented on board a motor vehicle. The motor vehicle may be equipped with an on-board or "embedded" wireless network access device or module (NAD), at the time of manufacture or in the after market. The NAD has an interface to the network 200 for communications with IVS systems. Other aspects of the vehicle network are indicated by way of illustration and not limitation.

The wireless network access device (NAD), as shown, includes a USIM chip and local memory, much like a smart phone. It also includes an RF transceiver, antenna, etc. (not shown), again like many "cell phones."

In some designs, the NAD may be used by the vehicle (or vehicle operator) for various things, such as voice calls, stolen vehicle tracking or recovery, downloading traffic, weather or other information, to summon emergency services, (eCall) etc. In some cases, a vehicle may have an embedded NAD that is configured for eCall only service. eCalls can be initiated manually, or triggered automatically, for example by a crash detector system in the IVS, which communicates to the NAD via the bus 200.

Figure 3:
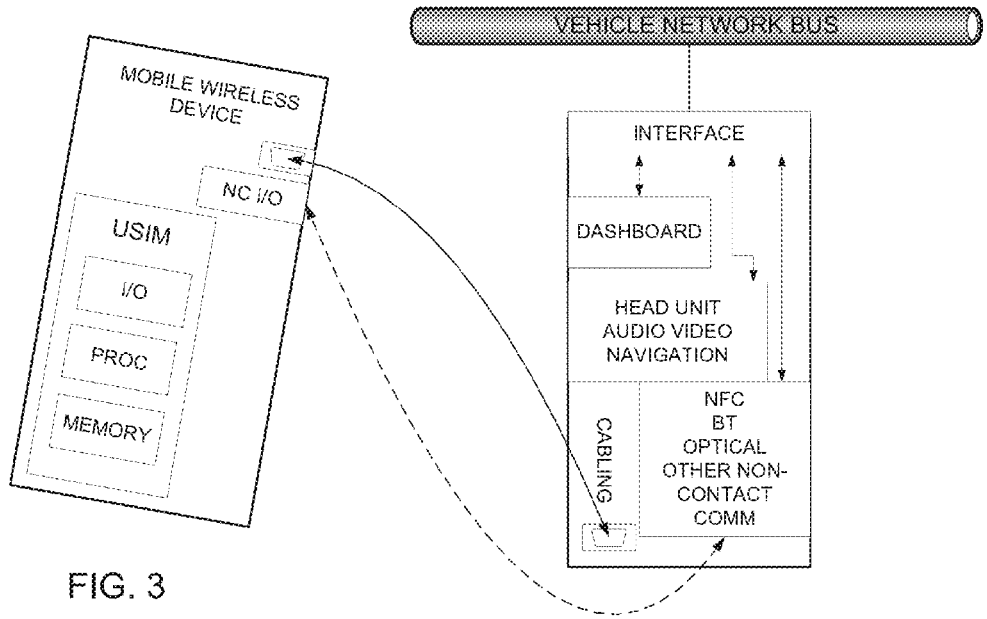
FIG. 3 illustrates an example of a user's mobile wireless device operatively coupled to a motor vehicle by means of a cable or a short-range non-contact link.

The present disclosure is not limited to embedded NADs. For example, a user's "cell phone" or "smart phone" or the like may be used to provide wireless network access in a vehicle. Referring now to FIG. 3, another example is shown in which a user's portable mobile wireless device is coupled to a motor vehicle to interoperate with the vehicle. For example, a smart phone may be coupled to a head unit via a cable or short-range wireless connection such a Bluetooth® connection. In some embodiments, the coupled smartphone may provide network access for an emergency call initiated automatically by the vehicle, for example as a result of crash detection. Thus we will use NAD in a broad sense, at least commensurate in scope with any MS (mobile station) or UE (user equipment), embedded in a vehicle, handheld, or otherwise mobile.

An NAD may be designed and configured to access both eCall and other non-emergency voice and data services. When a device is configured for "eCall only" operation, certain restrictions apply to its operation. In order to avoid the generation of large amounts of unnecessary mobility management signaling in the wireless network, including network registration, location updates and network deregistration, certain restrictions are placed on the operation of eCall 'only' configured network access devices. For example, restrictions should be applied in the case of a vehicle NAD, as long as a vehicle is operating normally and no state of emergency exists. Current technical specifications provide that:

An "eCall only" configured MS thus is not permitted to attempt to register on a mobile network at anytime except (1) when making an eCall, or (2) when making a call to one of the fixed dialing numbers stored on the SIM/USIM for the purpose of testing or requesting reconfiguration of the eCall capable MS.

While registered on a mobile network, an "eCall only" MS performs normal mobility management signaling. It can receive incoming calls, e.g. a call-back from a PSAP or Emergency Services, and it can make calls, but only to the fixed dialing numbers stored on the USIM. An "eCall only" configured MS must, following an eCall, test or reconfiguration call, deregister (detach) from the serving network within a specified time, currently 12 hours.

To reduce the network registration and call set-up time, an "eCall only" configured UE may, following power-up, perform a network scan to identify available mobile networks, without registering on any network. When an "eCall only" configured MS is in MM IDLE mode (powered up but not having a radio resource (RR) connection to a mobile network), it is referred to as being in MM IDLE sub-state eCall INACTIVE.

Published technical specifications further explain the sub-state as follows. "eCall only" mobile station (MS) eCall INACTIVE state and USIM information. According to 3GPP TS24.008:

eCALL INACTIVE (Sub-State or Service State)

Valid subscriber data are available, update status is U4, and a cell is selected, which is expected to be able to provide normal service. Only emergency services and test/reconfiguration calls [8] can be initiated by the mobile station. This state is applicable only to an eCall only mobile station (as determined by information configured in USIM). The state is entered by the mobile station in order to avoid MM activity and MM signaling in the absence of an emergency call or test/reconfiguration call.'

The applicable USIM settings for an eCall only MS are shown in Table 1:

| USIM field | Contents |
| --- | --- |
| $EF_{UST}$ | Service n°2 Fixed Dialling Numbers (FDN) and Service n°89 eCall Data available |
| $EF_{FDN}$ | Display two FDNs, eCall Test Number (nnnnnn) and eCall reconfiguration number (nnnnnn) |
| $EF_{EST}$ | Enabled Services Table |

The services listed in the User Services Table ($EF_{UST}$) are selected and enabled in the Enabled Services Table ($EF_{EST}$).

Reconfiguration of an eCall Only Mobile Station (MS)

An eCall only MS may be reconfigured to remove network access restrictions and permit access to other subscription services under certain conditions. If an eCall only mobile station (MS) also has the capability to access other non-emergency services, and if a valid subscription to other services exists, then the MS may be reconfigured to remove the network and service access restrictions, as follows.

At present an "eCall only" MS may be reconfigured to remove the network access restriction by changing the USIM settings. The settings are changed from those indicated in Table 1 above to those shown in Table 2 below:

| USIM field | Contents |
|---|---|
| $EF_{UST}$ | Service n°4 Service Dialling Numbers (SDN) and Service n°89 eCall Data available |
| $EF_{SDN}$ | Display two SDNs, eCall Test Number (nnnnnn) and eCall reconfiguration number (nnnnnn) |
| $EF_{EST}$ | Enabled Services Table |

When the USIM settings have been reconfigured to those shown in table 2, for example via an HMI (device interface) or via and OTA (over the air) command, the MS may no longer perform the eCall INACTIVE mode procedures specified in TS24.008, quoted above. When an eCall only MS is reconfigured in accordance with Table 2, the fixed dialed numbers (FDN) service #2 is deselected and service dialed number (SDN) service #4 is enabled. As shown in both tables 1 and 2, the eCall Data Available service #89 remains selected.

Thus, as currently specified in TS24.008, if service #2 (FDN) is enabled, the eCall MS will follow the eCall INACTIVE mode procedures, on power-up and following an eCall, test call or reconfiguration call. Alternatively, if service #4 (SDN) is enabled then the eCall only MS does not follow the eCall INACTIVE procedures, and e.g. the timer values (T3242 and T3243), as specified in TS24.008, are ignored. A problem occurs, following the reconfiguration of an eCall only MS to permit access to other subscription services, when the owner of the mobile station wants to enable the Fixed Dialed Number service—because the MS may interpret this as meaning that it should operate in the eCall only/eCall INACTIVE state prior to and following and calls, as previously described.

We propose a new type of wireless service. This new service, which we refer to as restricted access and mobility management ("RAMM") is a type of wireless subscription service. (The name is merely for convenience. It is not critical, nor should it be deemed limiting.) RAMM should not be confused with an identifier of an eCall only mobile station. Rather, the new RAMM subscription service may be used by an eCall only MS, or by any other suitable wireless device, for example, machine to machine devices and remote alarms, as well as "smart phones," motor vehicles, and other ME, to operate in a restricted access and mobility management mode. This new service avoids the limitations of the prior art, provides for new applications and implementations, including and beyond the requirements of eCall.

In one embodiment, for eCall, the new RAMM subscription service may require an eCall capable MS to conform to the eCall only MS requirements as specified in 3GPP TS 22.101 and TS 24.008.

Subscription Service Management and Charging for Non-Emergency Calls

At present there exists no subscription service identifier to differentiate and manage Pre-paid subscription services and pre-paid eCall 'only' subscription services. A potential problem exists when a pre-paid (USIM) subscription is not used for several months (typically more than 6 months) and the network operator purges the subscriber records and other information from the HLR/HSS and VLR. This could lead to an eCall only MS being denied access to a mobile network because it no longer has a valid subscription, with potentially life threatening consequence. In an embodiment, the new RAMM subscription service avoids that limitation.

Figure 4:
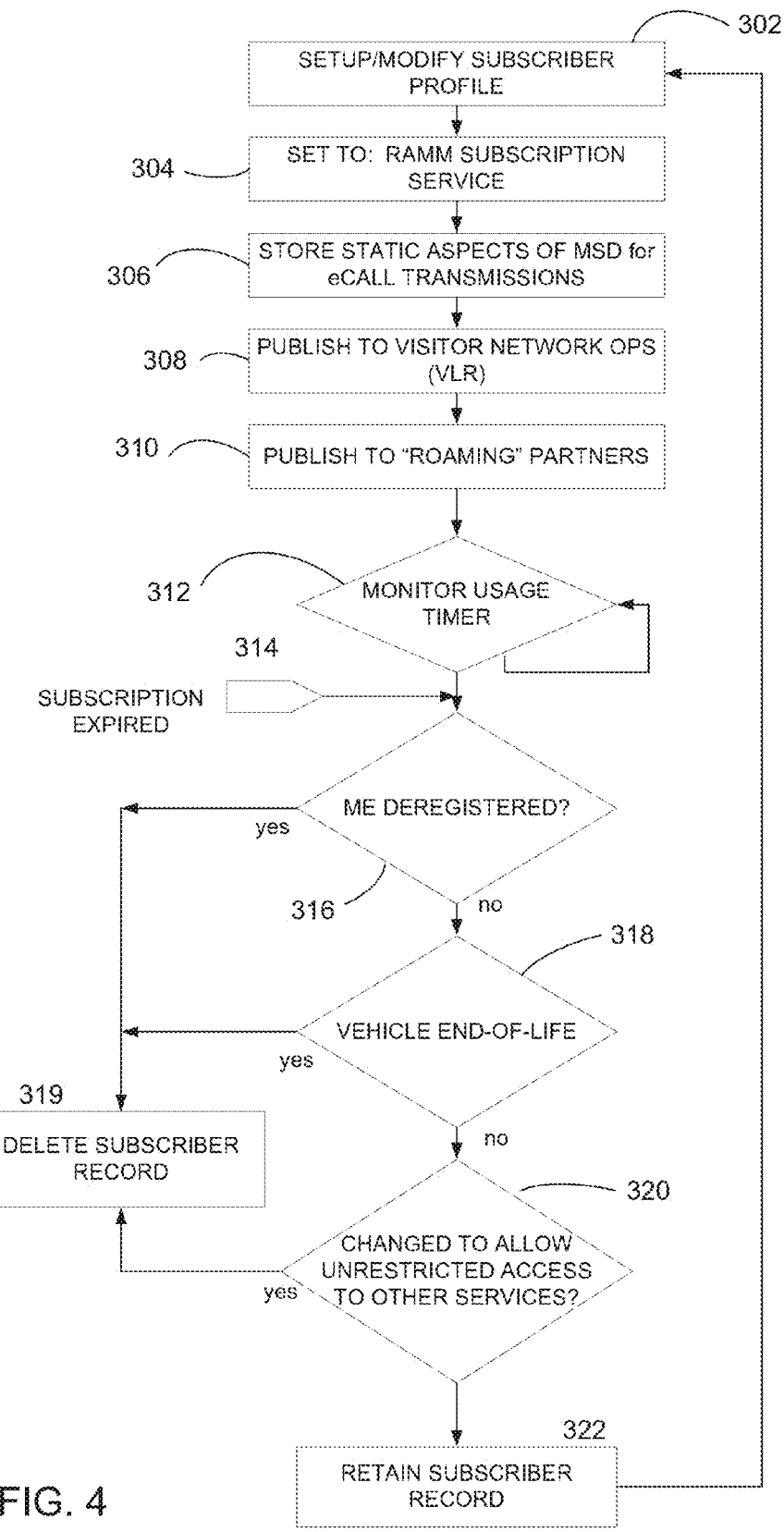
FIG. 4 is a simplified flow diagram illustrating one example of a restricted access and mobility management ("RAMM") subscription service implementation.

Referring now to FIG. 4, this simplified flow diagram illustrates one implementation incorporating the RAMM service. A subscriber record is initialized or updated in the HLR. For example, in the context of new motor vehicles, a car manufacturer may contract with a mobile carrier to subscribe for service for a large group of automobiles. This could be done with a single subscriber (the manufacturer) and a large number of distinct service subscriptions under that single subscriber. Alternatively, multiple subscribers could be used, corresponding, for example, to the car model, country of manufacturer or sale or other criteria. See block 302. In any event, a corresponding subscription is set up with the appropriate identifier(s) for each vehicle so as to give the vehicle NAD access to a mobile network, as in FIG. 1.

Here we discuss only a single vehicle for illustration. A RAMM service subscription is established for the vehicle, block 304. Certain static elements of MSD data may be stored, for example the corresponding vehicle VIN. See block 306. This data may be used in some cases to populate (or pre-populate, meaning prior to a crash) partial MSD. Other MSD data is acquired at the time of the crash, for example location. The subscription (HLR record) may be published to visitor network operations as appropriate, block 308, as well as published to roaming partner networks, block 310.

At this juncture, we assume the subscription is active. In some cases, depending on service settings noted below, a usage monitor timer may be implemented to limit usage of the network by the corresponding ME, illustrated at block 312. The subscription may have a limited time, or contract period, for example one year. When that period expires, in accordance with the present disclosure, it would be helpful to retain, rather than delete, the subscriber information in the record. It would be helpful to ensure that, even after expiration of the subscription, the vehicle NAD continues to have access for emergency eCall service only.

To that end, referring again to FIG. 4, upon expiration of the contract term, the system determines whether the ME has actually deregistered, decision 316. If so, the subscriber record may be deleted. Further, the system tests for vehicle end-of-life. This can be communicated to the network by various means. For example, when a vehicle is taken out of service, and the VIN retired, vehicle registration authorities may notify the carriers, or update a centralized database. In response to an indication of vehicle end-of-life, decision 318, once again the subscriber record may be deleted, block 319. Further, upon subscription expiration, the system checks whether the subscription had been modified so as to allow other services beyond RAMM. If so, the corresponding subscriber record is retained.

The restricted access and mobility management ("RAMM") service may be characterized by, but is not limited to, one or more of the following features:

The subscriber profile and records held in the mobile network (HLR/HSS) are not deleted until the subscription is cancelled e.g. vehicle end of life, deregistered, subscription changed to allow unrestricted access to other subscription services.

The subscriber or a third party service provider may be charged and billed for periodic test and reconfiguration calls made to a non-emergency number.

The operator determined RAMM subscription service settings can be synchronized between an eCall only MS and the HLR/HSS using standard over the air (OTA) device management procedures.

The mobile network operator can specify the minimum and maximum time that an eCall only MS, subscribed to the RAMM subscription service, can remain registered on a mobile network.

The RAMM subscription service settings and subscriber details can be provided to visited network operators and roaming partners.

The RAMM subscription service subscriber information, held by the network operator, can include some of the semi-permanent information included in the Minimum Set of Data (MSD) transmitted from the PSAP from the vehicle's eCall system.

The RAMM subscription service when provisioned on the USIM may included some semi-permanent information to be included in the Minimum Set of Data (MSD), for example, the vehicle identity number (VIN), make and model of vehicle, fuel type, contact MSISDN, subscriber 'in case of emergency' (ICE) details. When an eCall is initiated this information may be used to populate the MSD information elements.

Figure 5:
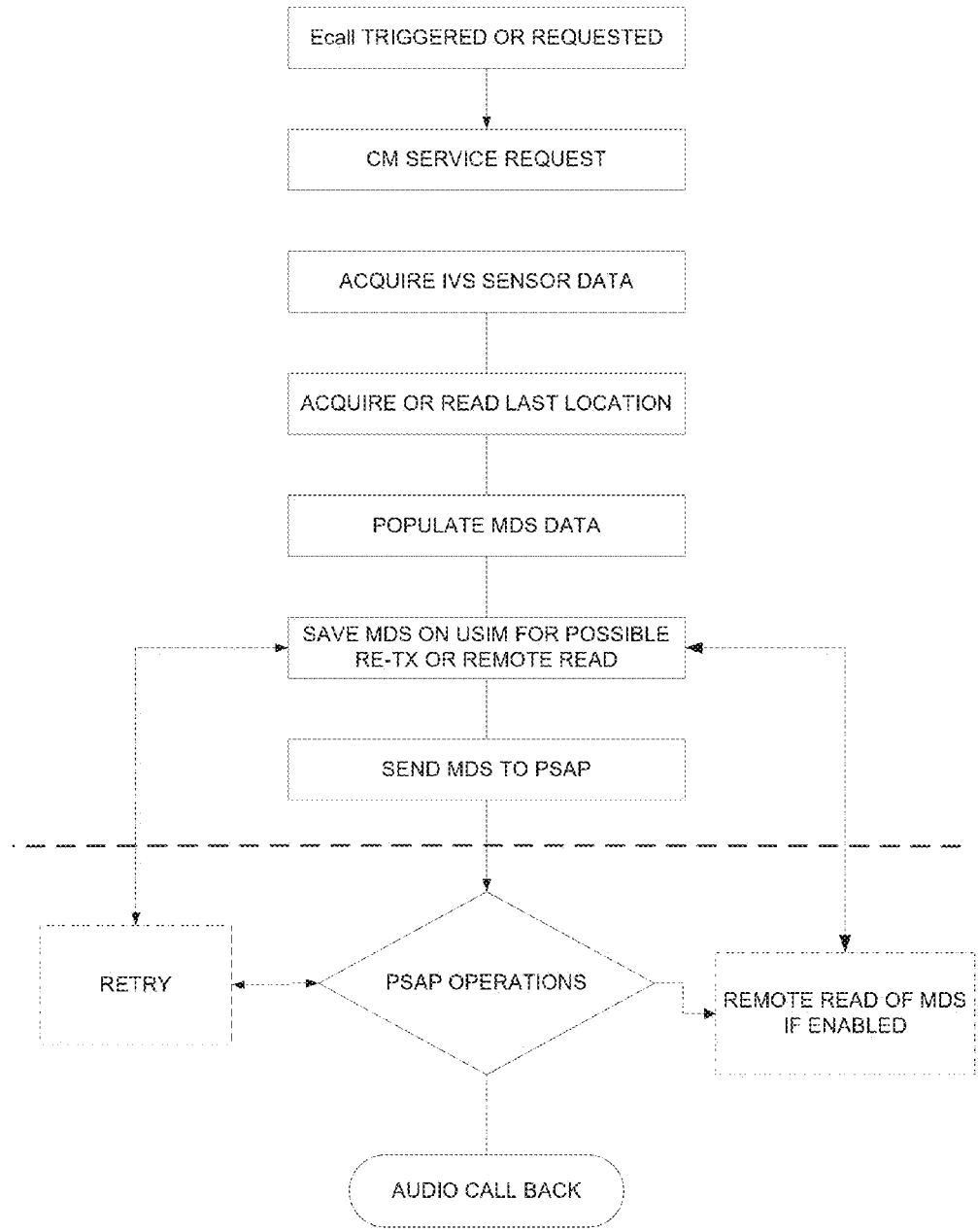
FIG. 5 is a simplified flow diagram illustrating one example of operation of an MS consistent with the present disclosure.

Referring now to FIG. 5, a simplified flow diagram illustrates some operations of an MS consistent with one aspect of the present disclosure. As illustrated, during or following an eCall, or a test call, a copy of the MSD may be stored on the USIM. It may be used for re-transmission or to enable a "remote read" if necessary. Remote read may be conducted by a PSAP or other authorized entity.

The RAMM (and non-restricted eCall Service) may include the necessary permissions and provisions to allow eCall related information to be retrieved from the USIM, or stored in the device, and this may include reading the MSD, that may or may not have been transmitted from the vehicle following the initiation of an eCall or test call.

In some embodiments, the RAMM subscription service (and non-restricted eCall Service) may periodically update the information stored on the USIM and in the ME. This may include changes to the eCall only MS operating parameters and values, including timer values specified from time to time by standards bodies (CEN, ETSI, 3GPP).

The network operator may, where permitted by the terms and conditions of the RAMM service (and unrestricted eCall Service), utilize the Card Application Toolkit functions specified in ETSI TS 102 223 and in other specifications including 3GPP TS 31.111 Universal Subscriber Identity Module (USIM) Application Toolkit (USAT). Such actions may include, where supported by the eCall capable MS, the management of up to 8 device timers simultaneously (change timer values, activation, deactivation and reset timers when they are running). The network may also request the eCall capable MS to initiate a speech or data call, including a test eCall, to a number or other address stored on the USIM (e.g. as a fixed dialed number) or to another number/address (even if the MS has service #2 (fixed dialed number) enabled.

When the RAMM service is 'available' on the USIM, listed in $EF_{UST}$, and enabled in $EF_{EST}$, the eCall only MS preferably operates in the accordance with the network and service access limitations specified by the network operator and in accordance with the procedures specified in the relevant technical specifications.

While the previous descriptions of a RAMM service have been discussed, we also contemplate that similar subscription service features may be applied to machine to machine, and other wireless devices, where the device may not need to remain registered on a mobile network for long periods, prior to or following a call.

Figure 6:
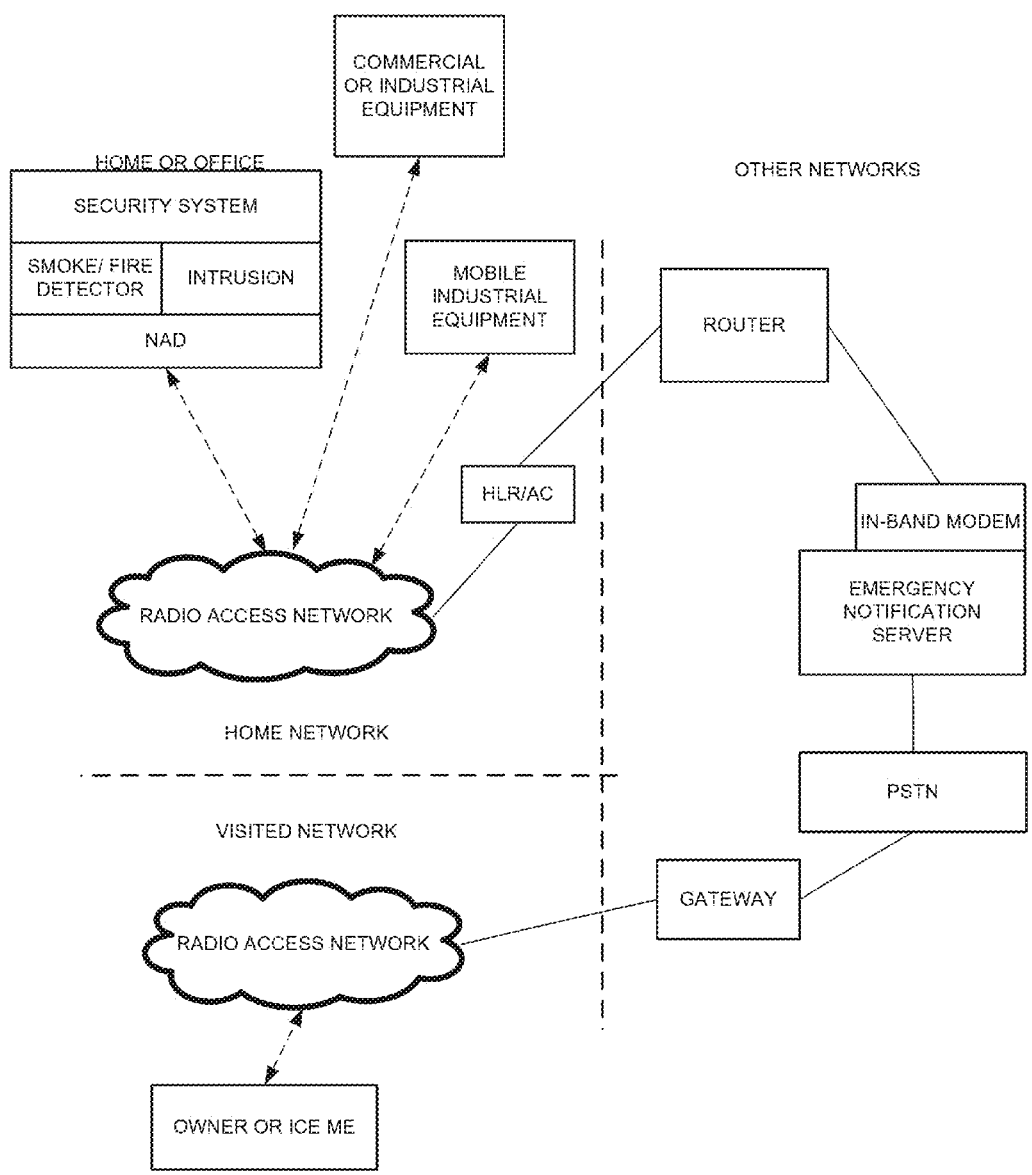
FIG. 6 is a simplified block diagram illustrating utilization of a restricted access and mobility management ("RAMM") subscription service consistent with the present disclosure to protect a home or business, or to interact with commercial or industrial equipment.

FIG. 6 illustrates some of these other applications, all within the scope and concepts of the present invention. In this drawing, a wireless network is shown as discussed above. Here, a home or office (or any building or location, park, etc.) has a smoke or fire detector system, intrusion alarm, or any other type of alarm or notification system. The system is coupled to an NAD, which in turn is associated to a RAMM subscription in the HLR. At first blush, it may seem unnecessary to utilize wireless communications to a fixed physical location. However, land line communications may not be available, or may not be available at reasonable cost, at the physical location to be protected. further, conventional wireless service is expensive, and unnecessary in this context where the system is on "standby" most of the time. However, in the event of a fire, intrusion, or other exigency, prompt wireless access is needed. The RAMM service disclose herein may be utilized and configured for this type of application.

Referring again to FIG. 6, other applications may include commercial or industrial equipment, which again may be in a fixed physical location. These too may be coupled to an NAD (now shown) for accessing the wireless network. In other embodiments, the NAD may be portable, and moved to the location of the equipment, for example a job site, for temporary use. Trigger events used to initiate a call may include, for example, moving the equipment, temperature, pressure, or other events or conditions.

In the drawing, the home, office, commercial site, equipment, etc accesses the wireless network when triggered. The HLR is consulted to route the call in various ways, depending on subscriber information and service settings. In one design, the call traverses a router to an emergency notification server. The server location may be manned or automated. Data such as the trigger condition, time stamp, etc. can be sent via an in-band modem to the emergency notification server. The server can be configured to place a call to any predetermined contact, for example using a subscriber database query. It may place a call via the PSTN, to a predetermined "in case of emergency" (ICE) contact number, similar to an eCall type of event. The call may traverse a wireless network (here the visited network) if necessary to reach the ICE ME.

Continuing the summary of selected features and options for a RAMM service, network access restrictions and mobile management signaling restrictions may also be included in the subscription service profile (characterization). These may include a restriction on the frequency of periodic location updates (possibly none if the device is stationary or static).

In some designs, selective access barring and end-of-life management may also be facilitated by the use of the 'restricted' RAMM service which may include and/or make use of the eCall only device identifier.

The mobile network, utilizing the RAMM service, may monitor the time that a RAMM service subscriber device registers on a network, the start and completion time of eCalls and other calls, and use this information for mobility management purposes. See one aspect in 312 in FIG. 4. This may include initiating an IMSI detach procedure to deregister an eCall only MS from the home PLMN or a visited PLMN after a pre-determined period, and/or instructing the eCall only MS to revert to the MM IDLE eCall INACTIVE state, or other state in accordance with the provisions of the eCall Only Service.

In another aspect, an eCall capable MS performs an IMSI Attach and/or Location when registering with a serving network. The serving network may use this event together with the subscription details stored in the HLR/HSS to increase or decrease the time interval between periodic location updates (PLU), and according to the type of call. For example, following an eCall an MS could be instructed to perform a PLU every 10 minutes to verify that the MS is still registered on the network. Alternatively the serving network may combine a PLU event with a network initiated IMSI Detach to deregister an MS from the network. In this case the eCall capable MS may or may not be an MS designed for eCall 'only' operation.

It will be obvious to those having skill in the art that many changes may be made to the details of the above-described embodiments without departing from the underlying principles of the invention. The scope of the present invention should, therefore, be determined only by the following claims.

The invention claimed is:

1. A method for use in a digital wireless telecommunications network comprising:
    providing a home location register (HLR) database for maintaining subscriber profile information and respective subscription information for each subscriber;
    for a given subscriber, indicating in the corresponding HLR record a subscription to a restricted access and mobility management (RAMM) subscription service, wherein the RAMM subscription service is associated with a network access device (NAD); and
    pursuant to the RAMM subscription service, retaining the subscriber profile information in the HLR database after the subscription to the RAMM service expires;
    further comprising retaining the subscriber profile information in the HLR until the occurrence of a predetermined trigger event; and
    wherein the RAMM subscription service enables emergency calls to an emergency call taker facility until the trigger event.

2. The method of claim 1 wherein the RAMM subscription service includes an option to charge the subscriber or a third party service provider for periodic test and reconfiguration calls made to a non-emergency number.

3. The method of claim 1 wherein the trigger event comprises notification of end of life of a motor vehicle associated with the NAD.

4. The method of claim 1 wherein the trigger event comprises deregistration of the network access device (NAD).

5. A method for use in a digital wireless telecommunications network comprising:
    providing a home location register (HLR) database for maintaining subscriber profile information and respective subscription information for each subscriber;
    for a given subscriber, indicating in the corresponding HLR record a subscription to a restricted access and mobility management (RAMM) subscription service, wherein the RAMM subscription service is associated with a network access device (NAD) of a machine; and
    wherein the stored RAMM subscription information includes RAMM service settings, and further comprising synchronizing the stored RAMM service settings between an RAMM mobile station (MS) and the home location register (HLR) using over the air (OTA) device management procedures; and
    wherein the machine comprises a remote alarm system.

6. The method of claim 5 wherein the stored RAMM service settings include specifying a minimum and maximum time that an eCall only mobile station (MS), subscribed to the RAMM Service, can remain registered on a mobile network.

7. The method of claim 5 and further comprising transmitting the RAMM service settings and subscription details to visited network operators and roaming partners.

8. A method for use in a digital wireless telecommunications network comprising:
    providing a home location register (HLR) database for maintaining subscriber profile information and respective subscription information for each subscriber;
    for a given subscriber, indicating in the corresponding HLR record a subscription to a restricted access and mobility management (RAMM) subscription service, wherein the RAMM subscription service is associated with a network access device (NAD) of a motor vehicle; and
    for the subscriber having a current subscription to the RAMM subscription service, maintaining at least the corresponding subscriber profile information held in the home location register HLR until the occurrence of a predetermined trigger event;
    wherein the vehicle is equipped with an eCall system comprising an embedded mobile station (MS) operatively coupled to a crash detection system in the vehicle.

9. The method of claim 8 and further comprising provisioning the RAMM Service on a USIM of the embedded mobile station.

10. The method of claim 9 wherein provisioning the RAMM Service on the USIM includes storing selected information on the USIM for inclusion in a Minimum Set of Data (MSD) for transmission to a PSAP from the motor vehicle's eCall system in the event of an emergency.

11. The method of claim 10 wherein the selected information includes at least one of the vehicle identity number (VIN), make and model of vehicle, fuel type, contact MSISDN, and subscriber 'in case of emergency' (ICE) details.

12. The method of claim 10 and further comprising, during or following an eCall, storing the transmitted MSD on the USIM for possible re-transmission or a remote read by the PSAP.

13. The method of claim 5 wherein the remote alarm system triggers a call from the NAD in response to a trigger event associated with the machine.

14. The method of claim 13 wherein the trigger event associated with the machine comprises one or more of a set of trigger events including moving the machine, temperature, and pressure.

15. The method of claim 13 wherein the machine comprises stationary commercial or industrial equipment.

* * * * *